(12) United States Patent
Labastie

(10) Patent No.: US 9,061,757 B2
(45) Date of Patent: Jun. 23, 2015

(54) AUTOMATIC PILOTING METHOD AND SYSTEM FOR AN AIRCRAFT

(71) Applicant: Airbus Operations S.A.S., Toulouse (FR)

(72) Inventor: Marine Labastie, Toulouse (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 14/220,162

(22) Filed: Mar. 20, 2014

(65) Prior Publication Data

US 2014/0288732 A1 Sep. 25, 2014

(30) Foreign Application Priority Data

Mar. 25, 2013 (FR) ...................................... 13 52687

(51) Int. Cl.
*B64C 19/00* (2006.01)
*G05D 1/06* (2006.01)

(52) U.S. Cl.
CPC .............. *B64C 19/00* (2013.01); *G05D 1/0676* (2013.01)

(58) Field of Classification Search
CPC ............................. B64C 19/00; G05D 1/0676

USPC ........................................................... 701/11
See application file for complete search history.

(56) References Cited

U.S. PATENT DOCUMENTS 4,825,374 A * 4/1989 King et al. ........................ 701/5

FOREIGN PATENT DOCUMENTS

EP 0 444 541 A1 9/1991

* cited by examiner

*Primary Examiner* — Mary Cheung
*Assistant Examiner* — Yuen Wong
(74) *Attorney, Agent, or Firm* — Lerner, David, Littenberg, Krumholz & Mentlik, LLP

(57) ABSTRACT

The automatic piloting system includes an element for automatically supplying a computation unit, when the aircraft is guided according to a descending corrected speed and a new corrected speed which is greater than the corrected speed used for guidance of the aircraft is input by the pilot, with a predetermined maximum Mach number which replaces the current Mach number and which is intended to form, together with the new input corrected speed, a pair of speeds which is taken into account by the computation unit for determining the guidance instructions for the aircraft.

6 Claims, 1 Drawing Sheet

AUTOMATIC PILOTING METHOD AND SYSTEM FOR AN AIRCRAFT

FIELD OF THE INVENTION

The present invention relates to an automatic piloting method and system for an aircraft, in particular a transport airplane.

More particularly, the present invention applies to a descending flight managed by an automatic piloting system which notably comprises an input unit (or human/machine interface) which enables a pilot to input flight setpoints and at least one corrected speed, of CAS (calibrated air speed) type. This automatic piloting system additionally comprises a computation unit for determining guidance instructions for the aircraft using a pair of speeds comprising an input corrected speed and an optimum Mach number, with which is associated a transition altitude, as well as an automatic piloting device of A/P (autopilot) type for automatically applying these guidance instructions to the aircraft.

BACKGROUND OF THE INVENTION

In a descent, usually, such an automatic piloting system pilots the aircraft so that it flies, at first, according to a given Mach number (which is optimal for the descent), then according to a corrected speed (of CAS type) which has been input into the system by a pilot using the input unit (or automatically by a usual system), the transition between the two types of piloting taking place when the aircraft reaches the transition altitude associated with this pair of speeds (Mach number and input corrected speed). The transition altitude is the altitude at which the transition from the Mach number to a corrected speed is made with no true speed jump of TAS (true airspeed) type.

This transition altitude, between the piloting according to the Mach number and that according to the corrected speed, varies with the corrected speed. More specifically, it decreases when the corrected speed increases.

Consequently, when, during the descent, the aircraft is guided by corrected speed, a change of corrected speed can lead to a reversion to guidance by Mach number and have undesirable effects on the piloting of the aircraft. More specifically, if the aircraft is piloted according to a (so-called initial) corrected speed, and the pilot inputs a new corrected speed which is greater than this initial speed used for guidance, the system takes into account a new transition altitude (representative of the Mach number and of the new corrected speed) which is lower than the initial transition altitude.

Now, if, at the time when the new corrected speed is input, the aircraft is located above the new transition altitude, the aircraft will be piloted according to the Mach number (which is, overall, constant), that is to say without acceleration. In this case, the aircraft does not accelerate, even though the pilot has inputted a correct speed greater than the initial corrected speed.

This situation can disturb the pilot, since the aircraft does not accelerate when he or she inputs a setpoint requiring an increase in the speed CAS.

BRIEF SUMMARY OF THE INVENTION

The present invention relates to an automatic piloting method for an aircraft which makes it possible to remedy this drawback.

To this end, according to an aspect of the invention, said method for piloting an aircraft which is piloted by an automatic piloting system comprising an input unit enabling a pilot to input at least one corrected speed (of CAS type), a computation unit for determining guidance instructions for the aircraft using a pair of speeds comprising an input corrected speed and a current Mach number, with which is associated a transition altitude, and an automatic piloting device for applying these guidance instructions automatically to the aircraft, is noteworthy in that it comprises steps consisting in:

a) automatically detecting a situation in which, the aircraft being guided according to a descending corrected speed, a new corrected speed is input by the pilot using the input unit;

b) automatically comparing the new corrected speed input by the pilot with the corrected speed used at the current instant for guidance; and c) when the new input corrected speed is greater than said corrected speed used for guidance, automatically replacing said current Mach number with a predetermined maximum Mach number, which is intended to form, together with the new input corrected speed, a pair of speeds which is taken into account by said computation unit for determining the guidance instructions.

Thus, by virtue of an aspect of the invention, when the aircraft is guided by descending corrected speed and the corrected speed is replaced manually (via the input unit) with a greater corrected speed, the Mach number associated with the new descending corrected speed is replaced by a maximum Mach number, namely the maximum possible Mach number for guiding the aircraft. Advantageously, this maximum Mach number depends on the type of the aircraft.

Consequently:

either the guidance remains slaved to the corrected speed and the aircraft accelerates to reach the new input corrected speed, if this new corrected speed is in the flight range (or flight envelope) at the current altitude of the aircraft;

or the aircraft accelerates up to the maximum Mach speed taken into account by virtue of an aspect of the invention (if the corrected speed is outside of the flight range at the current altitude) until the associated transition altitude is crossed, and it is then guided on the input corrected speed (when this input corrected speed lies within the flight range).

By virtue of these features, the crew therefore always perceives an acceleration when a pilot inputs a corrected speed greater than that previously used, which makes it possible to eliminate the abovementioned disturbance that exists with the usual piloting.

The present invention also relates to an automatic piloting system for an aircraft.

According to an embodiment of the invention, said automatic piloting system, of the type comprising an input unit enabling a pilot to input at least one corrected speed, a computation unit for determining guidance instructions for the aircraft using a pair of speeds comprising an input corrected speed and a current Mach number, with which is associated a transition altitude, and an automatic piloting device for applying these guidance instructions automatically to the aircraft, is noteworthy in that it also comprises:

a detection element for automatically detecting a situation in which the aircraft is guided according to a descending corrected speed and a new corrected speed is input by the pilot using the input unit;

a comparison element for comparing the new corrected speed input by the pilot with the corrected speed used at the current instant for guidance; and an auxiliary element for, when the new input corrected speed is greater than said corrected speed used for guidance, automatically supplying the computation unit with a predetermined maximum Mach number which replaces the current Mach number and which is intended to form, together with the new input corrected speed, a pair of speeds which is taken into account by said computation unit for determining the guidance instructions.

Furthermore, in a preferred embodiment, said automatic piloting system comprises:
- a multifunction control and display unit, of MCDU (multifunction control and display unit) type, which comprises said input unit; and/or
- a flight management system, of FMS (flight management system) type, which comprises said computation unit, said detection element, said comparison element and said auxiliary element.

Moreover, the present invention also relates to an aircraft, in particular a transport airplane, which comprises an automatic piloting system such as that mentioned above.

BRIEF DESCRIPTION OF THE DRAWINGS

The figures of the appended drawing will give a clear understanding as to how the invention can be produced. In these figures, identical references designate similar elements.

DETAILED DESCRIPTION

Figure 1:
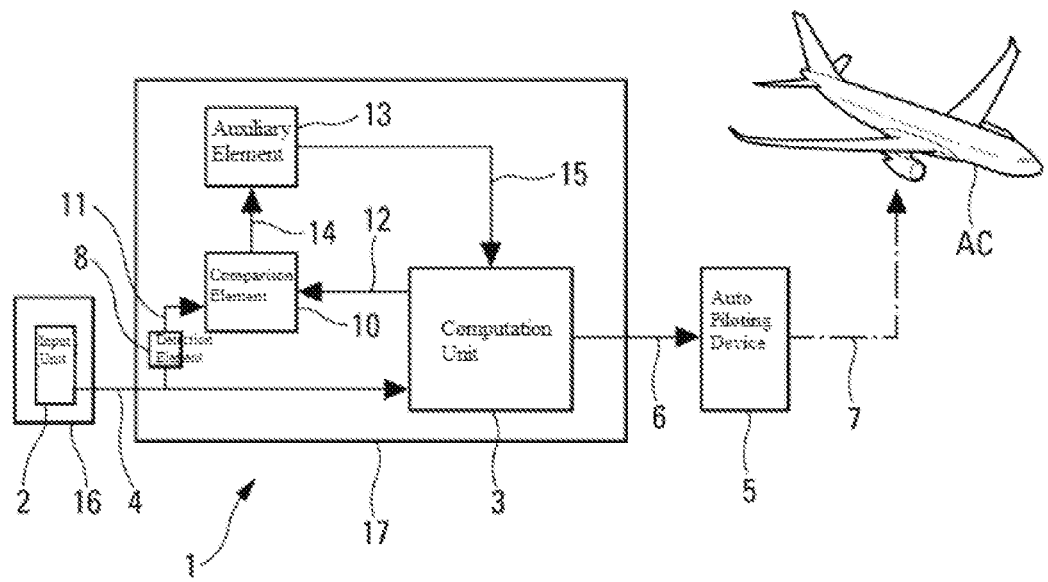
FIG. 1 is a block diagram of a system which illustrates an embodiment of the invention.

The system 1 schematically represented in FIG. 1 to illustrate an embodiment of the invention is intended for the automatic piloting of an aircraft AC, in particular of a transport airplane.

Although the system 1 is represented outside the aircraft AC in FIG. 1 for the purposes of simplifying the drawing, this system 1 is obviously embedded in the aircraft AC.

Said system 1 is of the type comprising:
- an input unit 2 (or human/machine interface) which comprises usual means, for example elements such as keys or buttons or control means such as a control ball or a touchpad, which enables an operator, notably a pilot, to input flight setpoints and at least one corrected speed (of CAS type) into said system 1;
- a computation unit 3 which is linked to said input unit 2 via a link 4 and which is likely to determine, usually, guidance instructions for the aircraft AC using a pair of speeds comprising an input corrected speed (using the unit 2) and a current Mach number (computed in the usual manner), with which is associated, usually, a transition altitude; and
- an automatic piloting device 5 which is linked to said computation unit 3 via a link 6 and whose function is to automatically apply the guidance instructions received from the computation unit 3 to the aircraft, as schematically illustrated by a chain-dotted line arrow 7 in FIG. 1.

In a descent, usually, such an automatic piloting system 1 pilots the aircraft AC so that it flies, at first, according to a given Mach number (which is optimal for the descent), then according to a corrected speed (of CAS type) which has been input into the system 1 by a pilot using the input unit 2, the transition between the two types of piloting taking place when the aircraft AC reaches the transition altitude associated with this pair of speeds (Mach number and input corrected speed).

Figure 2:
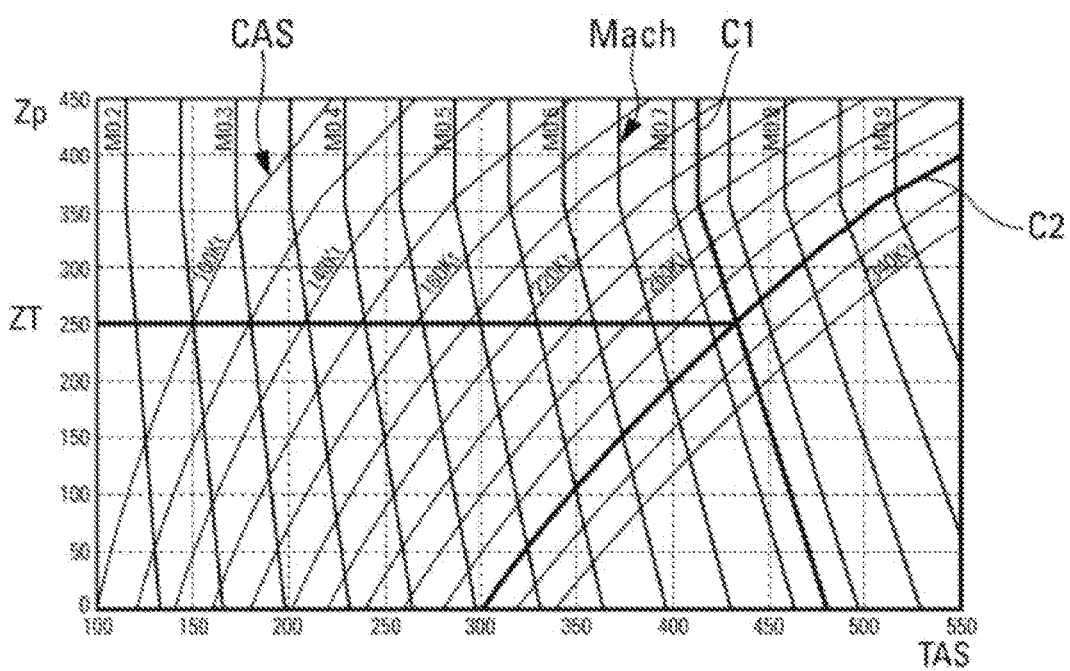
FIG. 2 is a diagram which illustrates respective iso-speed and iso-Mach variations as a function of the true speed and altitude.

FIG. 2 shows, by way of illustration, a pair formed by a given Mach number (curve C1) and a corrected speed or speed CAS (curve C2), with which is associated a transition altitude ZT.

This FIG. 2 is a diagram which illustrates, more generally:
- iso-speeds (CAS), that is to say constant speed curves, for some of which there is indicated the corresponding speed expressed in knots (Kt): 100 Kt, 140 Kt, . . . , and
- iso-Mach numbers, that is to say constant Mach number curves, for some of which there is indicated the corresponding Mach number (M): M0.2, M0.3, . . . .

These curves are represented in a diagram, for which the X axis represents the true speed, of TAS (true airspeed) type, which is expressed in knots, and for which the Y axis represents the altitude (Zp) which is expressed by flight level, of FL (flight level) type.

According to an embodiment of the invention, said automatic piloting system 1 also comprises:
- a detection element 8 which is linked to said input unit 2 via the link 4 and which is likely to automatically detect a situation in which the aircraft AC is guided according to a descending corrected speed and a new corrected speed is input by the pilot using this input unit 2;
- a comparison element 10 for comparing the new corrected speed input by the pilot and received via a link 11 with the corrected speed used at the current instant for guidance and received for example from the computation unit 3 via a link 12; and
- an auxiliary element 13 which is linked to said comparison element 10 via a link 14 and which is likely to automatically supply the computation unit 3 (via a link 15), when the comparison element 10 concludes that the new input corrected speed is greater than said corrected speed used for guidance, with a predetermined maximum Mach number which replaces the current Mach number. This predetermined maximum Mach number is intended to form, together with the new input corrected speed, a new pair of speeds which is taken into account by said computation unit 3 for determining the guidance instructions. This maximum Mach number (which represents the maximum possible Mach number for guiding the aircraft) depends on the type of the aircraft and is stored in the auxiliary element 13.

Furthermore, in a preferred embodiment, said input unit 2 forms part of a multifunction control and display unit 16, of MCDU (multifunction control and display unit) type.

Furthermore, in this preferred embodiment, said computation unit 3, said detection element 8, said comparison element 10 and said auxiliary element 13 form part of a flight management system 17, of FMS (flight management system) type.

The operation of the system 1 is detailed hereinbelow.

When the aircraft AC is guided automatically by descending corrected speed using the system 1 and the corrected speed is replaced manually by a pilot (via the input unit 2) with a greater corrected speed, the Mach number associated with the new descending corrected speed is replaced in the computation unit 3 (using the auxiliary element 13) with the maximum possible Mach number for guiding the aircraft AC.

Consequently:
- if the new input corrected speed is in the flight range at the current altitude of the aircraft AC, the guidance is slave to the corrected speed and the aircraft AC accelerates to reach this new input corrected speed; and if the input corrected speed is outside of the flight range at the current altitude, the aircraft AC is accelerated up to the maximum Mach number taken into account by virtue of an aspect of the invention, and continues like this until the transition altitude (associated with said maximum Mach number and with said new input corrected speed) is crossed, and it is then guided on the input corrected speed when this input corrected speed lies within the flight range.

That makes it possible to immediately use the input speed, while guaranteeing the conformity of the target speed with the capabilities of the aircraft AC (flight envelope).

By virtue of these features, a pilot therefore always perceives an acceleration when he or she inputs into the system 1 a corrected speed greater than that previously used.

It will be noted that the replacement of the descent Mach number with the maximum Mach number makes it possible to raise the maximum altitude of use of the corrected speed (transition altitude). This makes it possible to force the guidance to a defined corrected speed that can be modified by the crew.

Consequently, by virtue of an aspect of the invention, when the aircraft AC flies under the transition altitude and it is guided by corrected speed, via the means 17 and 5, the flight management system 17 automatically reassigns a maximum Mach number in case of input of a corrected speed greater than the current corrected speed. Whatever the input corrected speed, it is therefore immediately used as target speed for the guidance, provided that it lies within the flight range.

The invention claimed is:

1. A method for piloting an aircraft piloted by an automatic piloting system comprising an input unit enabling a pilot to input a new corrected speed, a computation unit for determining guidance instructions for the aircraft using a pair of speeds comprising an input corrected speed and a current Mach number, the pair of speeds being associated with a transition altitude, and an automatic piloting device for applying the guidance instructions automatically to the aircraft,
wherein the method comprises:
a) automatically, by a detection element, detecting a situation in which, the aircraft being guided according to a descending corrected speed, the new corrected speed is input by the pilot using the input unit;
b) automatically comparing, by a comparison element, the new corrected speed input by the pilot with said descending corrected speed used at a current instant for guidance; and
c) when the new input corrected speed is greater than said descending corrected speed used for guidance, automatically replacing, by an auxiliary element, said current Mach number with a predetermined maximum Mach number, which is intended to form, together with the new input corrected speed, the pair of speeds which is taken into account by said computation unit for determining the guidance instructions.

2. The method as claimed in claim 1, wherein the predetermined maximum Mach number depends on a type of the aircraft.

3. An automatic piloting system for an aircraft, said automatic piloting system comprising:
an input unit enabling a pilot to input a new corrected speed;
a computation unit for determining guidance instructions for the aircraft using a pair of speeds comprising an input corrected speed and a current Mach number, with which is associated a transition altitude;
an automatic piloting device for applying the guidance instructions automatically to the aircraft;
a detection element for automatically detecting a situation in which the aircraft is guided according to a descending corrected speed and the new corrected speed is input by the pilot using said input unit;
a comparison element for comparing the new corrected speed input by the pilot with said descending corrected speed used at a current instant for guidance; and
an auxiliary element for, when the new input corrected speed is greater than said descending corrected speed used for guidance, automatically supplying the computation unit with a predetermined maximum Mach number which replaces the current Mach number, the predetermined maximum Mach number is intended to form, together with the new input corrected speed, the pair of speeds which is taken into account by said computation unit for determining the guidance instructions.

4. The system as claimed in claim 3, further comprising a multifunction control and display unit comprising said input unit.

5. The system as claimed in claim 3, further comprising a flight management system comprising said computation unit, said detection element, said comparison element and said auxiliary element.

6. An aircraft, comprising:
an input unit enabling a pilot to input at least one corrected speed;
a computation unit for determining guidance instructions for the aircraft using a pair of speeds comprising an input corrected speed and a current Mach number, with the pair of speeds being associated with a transition altitude;
an automatic piloting device for applying the guidance instructions automatically to the aircraft;
a detection element for automatically detecting a situation in which, the aircraft being guided according to a descending corrected speed, a new corrected speed is input by the pilot using the input unit;
a comparison element for comparing the new corrected speed input by the pilot with said descending corrected speed used at a current instant for guidance; and
an auxiliary element for, when the new input corrected speed is greater than said descending corrected speed used for guidance, automatically supplying said computation unit with a predetermined maximum Mach number which replaces the current Mach number and the predetermined maximum Mach number is intended to form, together with the new input corrected speed, the pair of speeds which is taken into account by said computation unit for determining the guidance instructions.

* * * * *